(12) United States Patent
Gruver

(10) Patent No.: US 10,044,663 B2
(45) Date of Patent: Aug. 7, 2018

(54) SYSTEM FOR ELECTRONIC MAIL SERVER CONFIGURATION MANAGEMENT

(71) Applicant: BANK OF AMERICA CORPORATION, Charlotte, NC (US)

(72) Inventor: David John Wesley Gruver, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 274 days.

(21) Appl. No.: 14/848,806

(22) Filed: Sep. 9, 2015

(65) Prior Publication Data

US 2017/0070465 A1    Mar. 9, 2017

(51) Int. Cl.
*G06F 15/16* (2006.01)
*H04L 12/58* (2006.01)
*H04L 12/24* (2006.01)

(52) U.S. Cl.
CPC .......... H04L 51/22 (2013.01); H04L 41/0816 (2013.01); H04L 41/0866 (2013.01); H04L 41/0886 (2013.01)

(58) Field of Classification Search
CPC . H04L 41/0873; H04L 67/34; G06F 9/44505; G06F 8/71
See application file for complete search history.

(56) References Cited

U.S. PATENT DOCUMENTS

| | | | |
|---|---|---|---|
| 2006/0085504 A1* | 4/2006 | Yang | H04L 51/12 709/206 |
| 2007/0130264 A1* | 6/2007 | Walker | H04L 41/0668 709/206 |
| 2009/0198783 A1* | 8/2009 | Bloomer, Jr. | G06Q 10/107 709/206 |
| 2010/0064013 A1* | 3/2010 | Aranzulla | H04L 51/30 709/206 |
| 2011/0271196 A1* | 11/2011 | Rakowski | H04L 51/00 715/735 |

* cited by examiner

*Primary Examiner* — Tauqir Hussain
*Assistant Examiner* — Kamran Mohammadi
(74) *Attorney, Agent, or Firm* — Michael A. Springs; Moore & Van Allen PLLC; James C. Edwards

(57) ABSTRACT

The present invention provides for a rules-based system for managing the configuration of electronic mail (email) and/or messaging servers within an enterprise. Rules can be created and implemented that are unique to the enterprise's environment. Embodiments of the present invention provide for checking the current, "live" configuration settings of a mail/message server by applying the applicable rules in the rules database to the current settings. As a result of executing the compliance check, settings that are non-compliant are identified. System configuration may allow for non-compliant settings to be automatically re-configured so as to be compliant with the rule, or the user may be provided with options to authorize automated reconfiguration of all non-compliant settings or select which non-compliant settings that the user desires to re-configure.

14 Claims, 3 Drawing Sheets

SYSTEM FOR ELECTRONIC MAIL SERVER CONFIGURATION MANAGEMENT

FIELD

In general, embodiments of the invention relate to computing networks and, more specifically, systems for managing the configuration of electronic mail servers.

BACKGROUND

Typically, mail and messaging servers, such as Exchange servers associated with Outlook® mail and messaging application (available from the Microsoft Corporation of Redmond, Washington) require deployment of numerous scripts to manage the configuration of such servers. In general, the numerous scripts required to manage configuration of mail and messaging servers do not function in unison, i.e., one specific script is executed to change one specific setting, while another specific script is executed to change another specific setting and so on.

Moreover, the deployment of such scripts is typically conducted manually, which is a labor intensive process exasperated, by the fact, that mail servers have a large volume of settings within the operating system and require the user to manipulate registry files, configuration files and the like to implement rec-configuration of settings.

Mail application settings may change either intentional or unintentional. Intentional changes to mail application settings may occur, manually, at the discretion of a user. Unintentional changes to mail applications settings may occur in response to system reconfiguration, such as deployment of a system patch or the like, which may configure application settings back to default or the like.

In addition, current methodologies for managing the configuration of mail and messaging servers do not provide for means to track compliance (i.e., providing an auditable trail to subsequently demonstrate that a mail server was compliant).

Therefore, a need exists to develop systems, apparatus, computer program products, methods and the like that efficiently identify non-compliances (i.e., erroneous settings) in live electronic mail (email) servers and either automatically correct the non-compliance or provide a user the ability to authorize automated correction of the non-compliance. Desired systems, apparatus, computer program products, methods and the like should allow for dynamic configuration management, such that changes to settings and the like and can be made on-the-fly without having to effect changes to computer application code. In addition, the desired systems, apparatus, computer program products, methods and the like should provide the ability to customize the configuration of all mail and messaging servers throughout an enterprise, taking into account the unique environment of each enterprise. Moreover, the desired systems, apparatus, computer program products, methods and the like should provide for reports that indicate the results of such systematic checks for setting compliance and, thus, provide an auditable trail to verify compliance.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer program products, methods or the like for a rules-based system for managing the configuration of electronic mail (email) and/or messaging servers within an enterprise. The rules-based system of the present invention allows users to configure all aspects of mail/messaging servers through the use of customizable configuration rules. Rules can be created and implemented that are unique to the enterprise's environment. Moreover, the rule-based engine of the present invention allows for rules to created that are specific to a particular type of setting and for the rules to be modified (i.e., settings changed or the like) without having to modify and/or manipulate the underlying software code.

Further, embodiments of the present invention provide for checking the current, "live" configuration settings of a mail/message server by applying the applicable rules in the rules database to the current settings. As a result of the executing the compliance check, settings that are non-compliant (i.e., fail to meet an associated rule) are identified. System configuration may allow for non-compliant settings to be automatically re-configured so as to be compliant with the rule, or the user may be provided with options to authorize automated reconfiguration of all non-compliant settings or select which non-compliant settings that the user desires to re-configure.

Moreover, embodiment of the present invention provide for a comprehensive means for generating and communicating reports that indicate current rules and the results of such compliance checks (i.e., which servers were non-compliant, which settings were non-compliant, which non-compliant settings were re-configured and the like).

A system for configuration management of electronic mail (email) servers defines first embodiments of the invention. The system includes a plurality of email servers, each server including a first computing platform having a first memory and at least one first processor in communication with the first memory. In addition, the system includes an email application stored in the first memory of each of the plurality of email servers, executable by the first processor and configured to store email application settings in one or more of registry files, configuration files and internet setting files.

Additionally, the system includes at least one email configuration management device including a second computing platform having a second memory and at least one second processor in communication with the memory. Further, the system includes a rules database configured to store a plurality of predefined customized configuration rules, each rule associated with at least one of the email application settings.

In addition, the system includes an email configuration management application stored in the second memory and executable by the second processor. The configuration management application is configured to retrieve, from the applicable files of the email servers, current email application settings and, retrieve, from the rules database, configuration rules applicable to each of the one or more email servers. Further, the configuration management application is configured to apply the retrieved and applicable configuration rules to the retrieved current email application settings to determine compliance status of each of the current email application settings associated with one or more email servers.

In specific embodiments of the system, the email configuration management application is further configured to allow a user to create the predefined customized configuration rules, wherein the rules are customized based on the business environment that the email servers are deployed in.

In other specific embodiments of the system, the email configuration management application is further configured to, in response to determining that the compliance status of one or more of the current email application settings is a non-compliant status, automatically re-configure the one or more non-compliant settings to comply with the applicable configuration rule. In other related embodiments of the system, the email configuration management application is further configured to, in response to determining that the compliance status of one or more of the current email application settings is a non-compliant status, provide a network-accessible user interface that is configured to provide a user an option to re-configure the one or more non-compliant settings to comply with the applicable configuration rule. Such options may include, but are not limited to, a first option to re-configure all of the one or more non-compliant settings to comply with the applicable configuration rule, a second option to select, from amongst the one or more non-compliant settings, the non-compliant settings which the user desires to re-configure to comply with the applicable configuration rule, and the like.

In still further specific embodiments of the system, the email configuration management application is further configured to, on-demand or on a predetermined schedule, generate and communicate a report including the configuration rules applicable to each of the one or more email servers. In other related embodiments of the system, the email configuration management application is further configured to, on-demand or on a predetermined schedule, generate and communicate a report that indicates the plurality of email servers compliant to the configuration rules (i.e., results of compliance checks).

Moreover, in additional embodiments of the system, the email configuration management application is further configured to provide for execution of temporal scripts to determine compliance status of one or more of the current email application settings associated with one or more email server, wherein the temporal scripts are subsequently replaced by a new configuration rule.

Additionally, in other specific embodiments of the system, the email configuration management rules database is configured to store a plurality of predefined configuration rules, wherein each of predefined configuration rules are formatted based on file type that stores an associated email application setting.

In still further embodiments of the system, the email configuration management application is further configured to provide a network-accessible user interface for creation and modification of the configuration rules.

A computer-implemented method for managing configuration of electronic mail (email) servers defines second embodiments of the invention. The method includes accessing, by a computing device processor, at least one of registry files, configuration files and internet setting files stored on a plurality of email servers to retrieve current email application settings, the method further includes accessing, by a computing device processor, an email configuration management rules database to retrieve pre-defined customized configuration rules applicable to each of the plurality of email servers. In addition, the method includes applying, by a computing device processor, the retrieved and applicable configuration rules to the retrieved current email application settings to determine compliance status of each of the current email application settings associated with the plurality of email servers.

In further specific embodiments the method includes, in response to determining the compliance status of each of the current email application settings, automatically re-configuring, by a computing device processor, one or more email application settings determined to be non-compliant, wherein re-configuring provides for changing the one or more settings to comply with the applicable configuration rule.

In other specific embodiments the method includes, in response to determining the compliance status of each of the current email application settings, providing, by a computing device processor, a network-accessible user interface that is configured to provide a user at least one option for re-configuring one or more settings determined to be non-compliant, wherein re-configuring provides for changing the one or more settings to comply with the applicable configuration rule. In such embodiments of the method the options provided to the user may include, but are not limited to, a first option to re-configuring all of one or more settings determined to be non-compliant and a second option to select, from amongst one or more settings determined to be non-compliant, the settings which the user desires to re-configure to comply with the applicable configuration rule.

Additionally, in further specific embodiments the method includes generating and communicating, by a computing device processor, a first report including the configuration rules applicable to each of the one or more email servers and a second report that indicates the plurality of email servers compliant to the configuration rules.

A computer program product including a non-transitory computer-readable medium defines third embodiments of the invention. The computer-readable medium includes a first set of codes for causing a computer to access, at least one of registry files, configuration files and internet setting files stored on an electronic mail (email) server to retrieve current email application settings. The computer-readable medium includes a second set of codes for causing a computer to access an email configuration management rules database to retrieve pre-defined customized configuration rules applicable to each of the plurality of email servers. Additionally, the computer-readable medium includes a third set of codes for causing a computer to apply the retrieved and applicable configuration rules to the retrieved current email application settings to determine compliance status of each of the current email application settings associated with the plurality of email servers.

Thus, systems, apparatus, methods, and computer program products herein described in detail below provide for a rules-based system for managing the configuration of electronic mail (email) and/or messaging servers within an enterprise. Rules can be created and implemented that are unique to the enterprise's environment. Embodiments of the present invention provide for checking the current, "live" configuration settings of a mail/message server by applying the applicable rules in the rules database to the current settings. As a result of the executing the compliance check, settings that are non-compliant are identified. System configuration may allow for non-compliant settings to be automatically re-configured so as to be compliant with the rule, or the user may be provided with options to authorize automated reconfiguration of all non-compliant settings or select which non-compliant settings that the user desires to re-configure.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
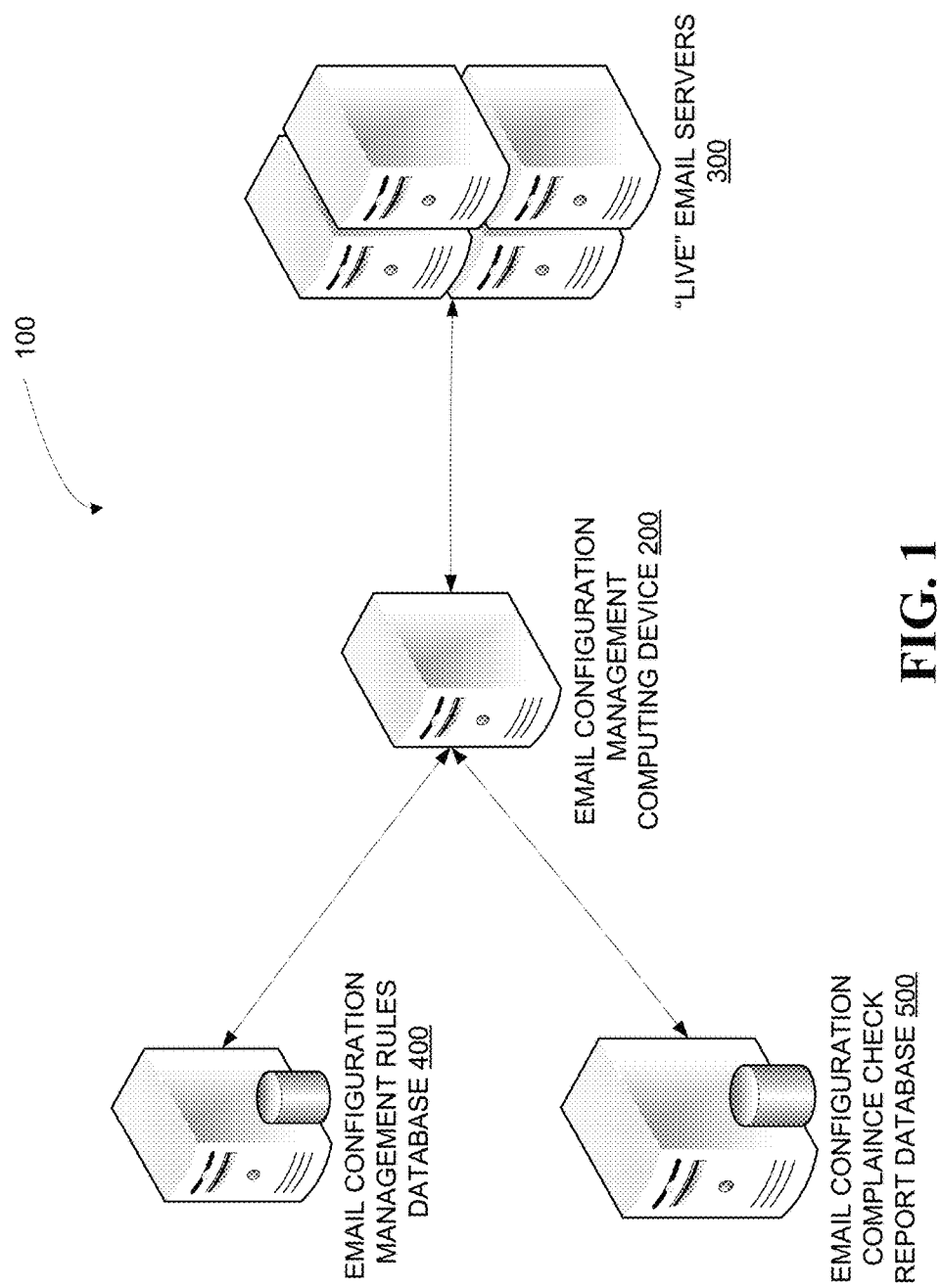
Figure 2:
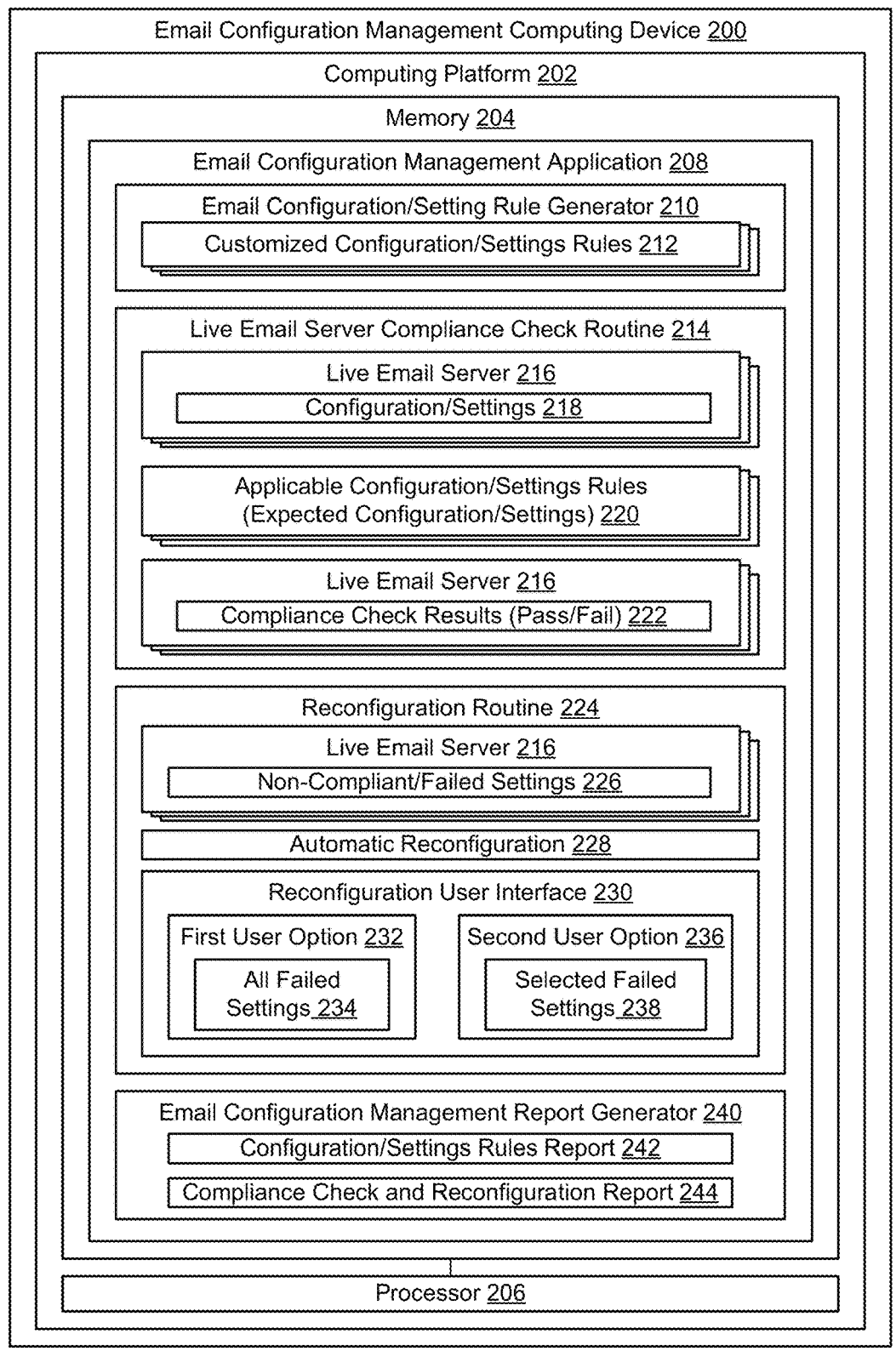
Figure 3:
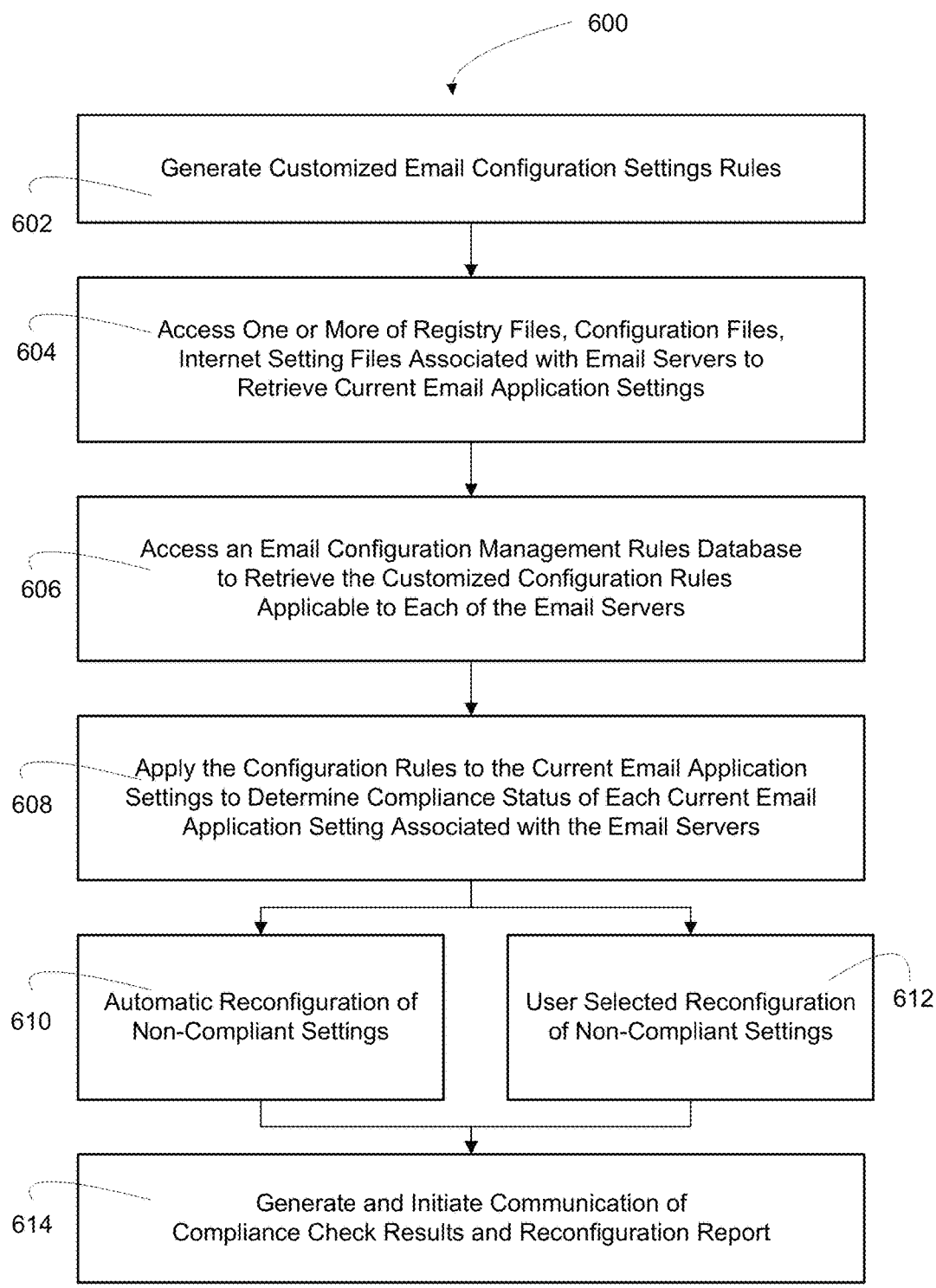

Having thus described embodiments of the invention in general terms, reference will now be made to the accompanying drawings, which are not necessarily drawn to scale, and wherein:

FIG. 1 provides a block diagram of a system for electronic mail (email) server configuration management, in accordance with embodiments of the present invention;

FIG. 2 provides a block diagram of an apparatus for email server configuration management, in accordance with embodiments of the present invention; and FIG. 3 provides a flow diagram of a method for email server configuration management, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for rules-based system for managing the configuration of electronic mail (email) and/or messaging servers within an enterprise. The rules-based system of the present invention allows users to configure all aspects of mail/messaging servers through the use of customizable configuration rules. Rules can be created and implemented that are unique to the enterprise's environment. Moreover, the rule-based engine of the present invention allows for rules to created that are specific to a particular type of setting and for the rules to be modified (i.e., settings changed or the like) without having to modify and/or manipulate the underlying software code.

Further, embodiments of the present invention provide for checking the current, "live" configuration settings of a mail/message server by applying the applicable rules in the rules database to the current settings. As a result of the executing the compliance check, settings that are non-compliant (i.e., fail to meet an associated rule) are identified. System configuration may allow for non-compliant settings to be automatically re-configured so as to be compliant with the rule, or the user may be provided with options to authorize automated reconfiguration of all non-compliant settings or select which non-compliant settings that the user desires to re-configure.

Moreover, embodiment of the present invention provide for a comprehensive means for generating and communicating reports that indicate current rules and the results of such compliance checks (i.e., which servers were non-compliant, which settings were non-compliant, which non-compliant settings were re-configured and the like).

Referring to FIG. 1, a block diagram is provided of system 100 configured to provide electronic mail (email) server configuration management; in accordance with embodiments of the present invention. The system 100 includes email configuration management computing device 200, which may comprise a server or any other computing device(s) capable of executing the email configuration management application (208 of FIG. 2). Email configuration management application is configured to generate, at the direction of a user, a plurality of customized email configuration management rules, which are subsequently stored in email configuration rules database 400. Email configuration management application is configured to generate customized configuration rules, which may be customized to reflect the unique environment of the enterprise in which the email servers are deployed including, but not limited to, customization on a per-server basis. Moreover, the configuration rules reflect the expected settings/values for the configuration the email servers 300. Email servers 300 may be electronic mail and messaging servers, messaging servers or any other server configured to disseminate communications amongst enterprise entities and internal or external entities.

Email configuration management application is additionally configured to execute a compliance check to insure that the enterprise-wide email servers are compliant with the configuration rules. In this regard, email configuration management application is configured to access, on a predetermined schedule or an ad hoc basis, the "live" (i.e., currently operating) email servers to retrieve the current email application settings. The email application settings may be retried from registry files, configuration files, internet setting files (e.g., .ins files) or the like. Additionally, email configuration management application is configured to access the rules database 400 to retrieve the applicable configuration rules for each of the email servers 300. Once the live email server settings and the rules have been retrieved, the application is configured to apply the rules to the live settings to determine a compliance status for each of the setting (i.e., determine whether a setting passes or fails the configuration rule). In the event that settings are determined to be non-compliant, the application may be configured such that predetermined settings are automatically corrected (i.e., reconfigure the setting to meet the rule), absent input from a user. While other settings may be configured such that a user input is necessary to correct a non-compliant setting. In this regard, the application may configured to provide a user real-time feedback, via a user-interface, as to the results of the compliance check, specifically indicating which settings on which servers are non-compliant.

Moreover, email configuration management application is configured to generate rules reports, which indicate current rules stored in the database 400 and compliance checks reports, which indicate the results of one or more compliance checks. Once generated, the reports are communicated to designated entities and/or stored in email configuration compliance check results database 500.

Referring to FIG. 2 a block diagram is presented of an email configuration management computing device 200, which, as previously noted may comprise one or more computing devices, such as server(s), router(s), or the like. The computing device 200 includes a computing platform 202. The computing platform 202 includes a memory 204 and at least one processor 206 in communication with the memory 204. Computing platform 202 is configured to receive and execute algorithms, such as modules, routines, and applications.

Memory 204 may comprise volatile and non-volatile memory, such as read-only and/or random-access memory (RAM and ROM), EPROM, EEPROM, flash cards, or any memory common to computer platforms. Further, memory 204 may include one or more flash memory cells, or may be any secondary or tertiary storage device, such as magnetic media, optical media, tape, or soft or hard disk. Moreover, memory 204 may comprise cloud storage, such as provided by a cloud storage service and/or a cloud connection service.

Further, processor 206 may be an application-specific integrated circuit ("ASIC"), or other chipset, processor, logic circuit, or other data processing device. Processor 206 or other processor such as ASIC may execute an application programming interface ("API") (not shown in FIG. 2) that interfaces with any resident programs or modules, such as email configuration management application 208 and routines, sub-modules associated therewith or the like stored in the memory 204 of computing platform 202.

Processor 206 includes various processing subsystems (not shown in FIG. 2) embodied in hardware, firmware, software, and combinations thereof, that enable the functionality of computing device 200 and the operability of the device on a network. For example, processing subsystems allow for initiating and maintaining communications and exchanging data with other networked computing platforms, such as email servers 300 (shown in FIG. 1), and databases 400 and 500 (shown in FIG. 1). For the disclosed aspects, processing subsystems of processor 206 may include any subsystem used in conjunction with email configuration management application 208 and related algorithms, sub-algorithms, modules, sub-modules thereof.

Computer platform 12 may additionally include a communications module (not shown in FIG. 2) embodied in hardware, firmware, software, and combinations thereof, that enables communications among the various components of the computing platform 202, as well as between the other networked devices. Thus, communication module may include the requisite hardware, firmware, software and/or combinations thereof for establishing and maintaining a network communication connection with email servers 300, rules database 400 and results database 500.

Memory 14 of computing platform 12 stores email configuration management application 208 that is configured to provide enterprise-wide configuration management to each email server deployed in the enterprise, in accordance with embodiments of the present invention. Email configuration management application 208 includes email configuration/setting rule generator that is configured to allow a user to generate, or modify existing, customized configuration/setting rules 212. The configuration rules 212 reflect the expected settings/values for the configuration the email servers. Once generated the configuration rules 212 are stored in rules database 400 (shown in FIG. 1). As previously discussed, the configuration rules 212 may be customized to reflect the unique environment of the enterprise in which the email servers are deployed including, but not limited to, customization on a per-server basis. In specific embodiments of the invention, the email configuration management application 208 is configured to provide a network-accessible (e.g., inter-net, Intranet or the like) user-interface for creating/generating configuration rules and/or modifying existing configuration rules (e.g., changing rule values or the like).

Additionally, email configuration management application 208 may be configured to allow a user to write and execute a temporal script for a new setting or component test. The temporal script can be executed on-the-fly to provide immediate testing/checking of the new setting. The temporal script may be employed until a subsequent configuration rule is developed and verified/tested.

Email configuration management application 208 further includes live email server compliance check routine 214 that is configured to check the current settings of live email servers to insure that the current settings comply with the settings called out in the applicable configuration rules, in accordance with embodiments of the present invention. As previous noted settings may change as a result of user input (i.e., manual change of settings), which may be intentional or inadvertent, or settings may change automatically in response to reconfiguration of the overall system, e.g., installation of system patches or the like, which may cause settings to revert to default levels or the like. The compliance check routine 214 may be configured to execute on a predetermined schedule, such as daily or may be executed on-demand, as required by the enterprise. The compliance check routine 214 is configured to access one or more, typically all, of the live (i.e., currently executing) email servers 216 to retrieve the configurations/settings 218, which may be stored in configuration files, registry files, internet setting files and the like. In addition, compliance check routine 214 is configured to access rules database 400 (shown in FIG. 1) to retrieve applicable configuration rules 220. Applicable configuration rules 220 may be applicable to specific email servers 216 or may be applicable to all the email servers 216 in the enterprise. Once the compliance check routine 214 has retrieved the email server settings 218 and the applicable configuration rules 220, the applicable confirmation rules 220 are applied to the email server settings 218 to determine compliance status results (i.e., pass or fail for each setting) 222 for each of the one or more live email servers 216.

Additionally, email configuration management application 208 includes reconfiguration routine 224 that is configured to reconfigure email server settings that were determined by the compliance check routine 214 to be non-compliant settings 226 (i.e., settings that failed to meet a corresponding configuration rule). The reconfiguration routine 224 is configurable such that a user can configure certain settings for automatic reconfiguration 228 in the event that the setting is found to be non-compliant. In this regard, automatic reconfiguration 228 provides for the setting to be automatically reconfigured to meet the configuration rule (i.e., correct setting) absent a need for user to approve or acquiesce the reconfiguration. The email configuration management application 208 may be configured to provide the user an alert/notification in response to conducting an automatic reconfiguration of a non-compliant setting and/or the subsequently generated compliance check and reconfiguration report 244 may indicate the occurrences of automatic reconfiguration 228. Additionally, the reconfiguration routine 224 is configurable such that a user can configure other certain settings to be reconfigured in response to user authorization/input. In such embodiments of the invention, the reconfiguration routine 224 may be configured to present a reconfiguration user-interface 230 that is configured to allow the user to choose from a first option 232, selectable to provide for automated reconfiguration of all of the non-compliant settings 234 associated with one specific server and/or all the servers being checked or a second option 234, which allows the user to select, setting-by-setting, which of the non-complaint/failed settings 238 the user desires to be reconfigure. It should be noted that when reconfiguration is configured to occur either automatically or based on user selection the reconfiguration is automated; meaning the reconfiguration occurs absent user input (i.e., the user does not have to access the files at the email server to make the requisite changes to the settings).

Additionally, email configuration management application 208 includes email configuration management report generator 240 that is configured to automatically, or on-demand based on user input, generate reports. The reports, may include, but are not limited to, configuration/settings rule reports 242 that indicate all of the current configuration rules including indication of expected settings for each email server. Additionally, the reports include compliance check results and reconfiguration report 244, which indicates the how the live email servers 216 compare to the configuration rules 220. In this regard, compliance check results and reconfiguration report 244 may indicate test name, tested object (i.e., server), tested property (i.e., setting), expected value (as indicated in the rule), actual value (as retrieved from email server), test result, test comments, test label and the like. In specific embodiments of the invention, the email configuration management application 208 may additionally be configured to provide a network-accessible (i.e., internet, Intranet or the like) user interface that is configured to allow a user to conduct report searches and/or generate customized reports that may be specific to email server, setting, time-frame or the like.

Referring to FIG. 3 a flow diagram is presented of a method 600 for email server configuration management, in accordance with embodiments of the present invention. At Event 602, customized email configuration setting rules are generated and stored in a rules database. As previously noted, the configuration rules may be customized to meet the unique environment of the enterprise.

At Event 604, a compliance check is initiated by accessing one or more, typically all of, the registry files, the configuration files and the internet setting files of each email server deployed in the enterprise to retrieve current email application settings. As previously noted the compliance check may be run on a predetermined schedule, such as daily, or the compliance check may be run on-demand at the discretion of the user/enterprise. At Event 606 (which may occur in parallel or in sequence with Event 604), an email configuration management rules database is accessed to retrieve rules applicable to each of the servers undergoing compliance checks. The applicable rules may be server-specific rules or certain rules may apply to all of the servers in the enterprise.

At Event 606, the configuration rules are applied to the current email application settings to determine compliance status for each current email application setting. The compliance status may include, but may not be limited to, one of (1) pass, or (2) fail. The results of the compliance status check may be provided to the user in a flat tile document or a network-accessible user-interface may be presented to provide a user real-time compliance check results.

At Event 610, based on user configuration, certain predefined settings found to be non-compliant are automatically reconfigured so that the setting meets that requirements of the associated rule (i.e., the setting is reconfigured to the expected value/setting). Automatic reconfiguration occurs absent user input/acquiesce in the reconfiguration. In such embodiments of the method, a notification/alert or other reporting mechanisms may be implemented to notify a user of the automatic reconfiguration of the non-compliant setting. At Event 620, based on user configuration, certain predefined settings, in some embodiments all settings, will require user input/approval to affect automated reconfiguration. in such embodiments of the method, a user may choose all non-compliant settings for reconfiguration or a user may select, setting-by-setting, which of the non-compliant setting they desire to reconfigure.

At Event 614, one or more compliance check result reports are generated and communication may be initiated to designated entities/individuals internal or external to the enterprise. In specific embodiments the compliance check result reports may include indication of which non-compliant settings have been reconfigured and whether the reconfiguration was automatic or at the bequest/approval of a user. In other embodiment, a separate report may be generated that includes the reconfiguration information.

Thus, systems, apparatus, methods, and computer program products described above provide for a rules-based system for managing the configuration of electronic mail (email) and/or messaging servers within an enterprise. Rules can be created and implemented that are unique to the enterprise's environment. Embodiments of the present invention provide for checking the current, "live" configuration settings of a mail/message server by applying the applicable rules in the rules database to the current settings. As a result of the executing the compliance check, settings that are non-compliant are identified. System configuration may allow for non-compliant settings to be automatically re-configured so as to be compliant with the rule, or the user may be provided with options to authorize automated reconfiguration of all non-compliant settings or select which non-compliant settings that the user desires to re-configure.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for configuration management of electronic mail servers, the system comprising:
    a plurality of electronic mail (email) servers, each server comprises a first computing platform having a first memory and at least one first processor in communication with the first memory;
    an email application stored in the first memory of each of the plurality of email servers, executable by the first processor and configured to store email application settings in registry files, configuration files and Internet setting files;
    at least one email configuration management device comprising a second computing platform having a second memory and at least one second processor in communication with the memory;
    an email configuration management rules database configured to store a plurality of predefined customized configuration rules, each rule associated with at least one of the email application settings; and
    an email configuration management application stored in the second memory, executable by the second processor and configured to:
        retrieve, from the registry files, configuration files and Internet setting files of the email servers while the email servers are operating, current email application settings,
        retrieve, from the email configuration management rules database, configuration rules applicable to each of the one or more email servers,
        apply the retrieved and applicable configuration rules to the retrieved current email application settings to determine compliance status of each of the current email application settings associated with one or more email servers, and
        in response to determining a non-compliance status for a plurality of the current email application settings associated with at least one of the email servers:
            automatically, without user input, reconfigure less than all of the plurality of current email application settings, wherein reconfiguring results in the email application setting complying with the applicable configuration rule,
            receive one or more user inputs that select for reconfiguration one of (i) all remaining current email application settings from amongst the plurality of current email applications application settings that were not automatically reconfigured, or (ii) less than all of the remaining current email applications application settings that were not automatically reconfigured, and
            in response to receiving the one or more user inputs, reconfigure at least one of the remaining current email application settings.

2. The system of claim 1, wherein the email configuration management application is further configured to allow a user to create the predefined customized configuration rules, wherein the rules are customized based on the business environment that the email servers are deployed in.

3. The system of claim 1, wherein the email configuration management application is further configured to, in response to determining that the compliance status of one or more of the current email application settings is a non-compliant status, provide a network-accessible user interface that is configured to provide a user an option to re-configure the one or more non-compliant settings to comply with the applicable configuration rule.

4. The system of claim 1, wherein the email configuration management application is further configured to, on-demand or on a predetermined schedule, generate a report including the configuration rules applicable to each of the one or more email servers.

5. The system of claim 1, wherein the email configuration management application is further configured to, on-demand or on a predetermined schedule, generate a report that indicates the plurality of email servers compliant to the configuration rules.

6. The system of claim 1, wherein the email configuration management application is further configured to provide for execution of temporal scripts to determine compliance status of one or more of the current email application settings associated with one or more email server, wherein the temporal scripts are subsequently replaced by a new configuration rule.

7. The system of claim 1, wherein the email configuration management rules database is configured to store the plurality of predefined, customized configuration rules, wherein each of the predefined, customized configuration rules are formatted based on file type that stores an associated email application setting.

8. The system of claim 1, wherein the email configuration management application is further configured to provide a network-accessible user interface for creation and modification of the configuration rules.

9. A computer-implemented method for managing configuration of electronic mail (email) servers, the method comprising:
  accessing, by a computing device processor, registry files, configuration files and Internet setting files stored on a plurality of email servers to retrieve, while the email servers are operating, current email application settings;
  accessing, by a computing device processor, an email configuration management rules database to retrieve pre-defined customized configuration rules applicable to each of the plurality of email servers;
  applying, by a computing device processor, the retrieved and applicable configuration rules to the retrieved current email application settings to determine compliance status of each of the current email application settings associated with the plurality of email servers; and
  in response to determining a non-compliance status for a plurality of the current email application settings associated with at least one of the email servers:
    automatically, without user input, reconfiguring the less than all of the plurality of the current email application settings, wherein reconfiguring results in the email application setting complying with the applicable configuration rule;
    receiving one or more user inputs that select for reconfiguration one of (i) all remaining current email application settings from amongst the plurality of current email applications application settings that were not automatically reconfigured, or (ii) less than all of the remaining current email applications application settings that were not automatically reconfigured; and
    in response to receiving the one or more user inputs, reconfiguring at least one of the remaining current email application settings.

10. The method of claim 9, further comprising, in response to determining the compliance status of each of the current email application settings, providing, by a computing device processor, a network-accessible user interface that is configured to provide a user at least one option for re-configuring one or more settings determined to be non-compliant, wherein re-configuring provides for changing the one or more settings to comply with the applicable configuration rule.

11. The method of claim 9, further comprising generating, on-demand or a predefined schedule, by a computing device processor a first report including the configuration rules applicable to each of the one or more email servers and a second report that indicates the plurality of email servers compliance to the configuration rules.

12. A computer program product comprising:
  a non-transitory computer-readable medium comprising:
    a first set of codes for causing a computer to access, registry files, configuration files and Internet setting files stored on an electronic mail (email) server to retrieve, while the email servers are operating, current electronic mail application settings;
    a second set of codes for causing a computer to access an electronic mail configuration management rules database to retrieve pre-defined customized configuration rules applicable to each of the plurality of electronic mail servers;
    a third set of codes for causing a computer to apply the retrieved and applicable configuration rules to the retrieved current electronic mail application settings to determine compliance status of each of the current electronic mail application settings associated with the plurality of electronic mail servers; and
    a fourth set of codes for causing a computer to, in response to determining a non-compliance status for a plurality of the current email application settings associated with at least one of the email servers:
      automatically, without user input, reconfigure less than all of the plurality of current email application settings, wherein reconfiguring results in the email application setting complying with the applicable configuration rule,
      receive one or more user inputs that select for reconfiguration one of (i) all remaining current email application settings from amongst the plurality of current email applications application settings that were not automatically reconfigured, or (ii) less than all of the remaining current email applications application settings that were not automatically reconfigured, and
      in response to receiving the one or more user inputs, reconfigure at least one of the remaining current email application settings.

13. The computer program product of claim 12, further comprising a fifth set of codes for causing a computer to, in response to determining the compliance status of each of the current electronic mail application settings, provide a network-accessible user interface that is configured to provide a user at least one option for re-configuring one or more settings determined to be non-compliant, wherein re-configuring provides for changing the one or more settings to comply with the applicable configuration rule.

14. The computer program product of claim 12, further comprising a fifth set of codes for causing a computer to, on-demand or on a predetermined schedule, generate a first report including the configuration rules applicable to each of the one or more email servers and a second report that indicates the plurality of email servers compliance to the configuration rules.

\* \* \* \* \*